Patented Feb. 10, 1942

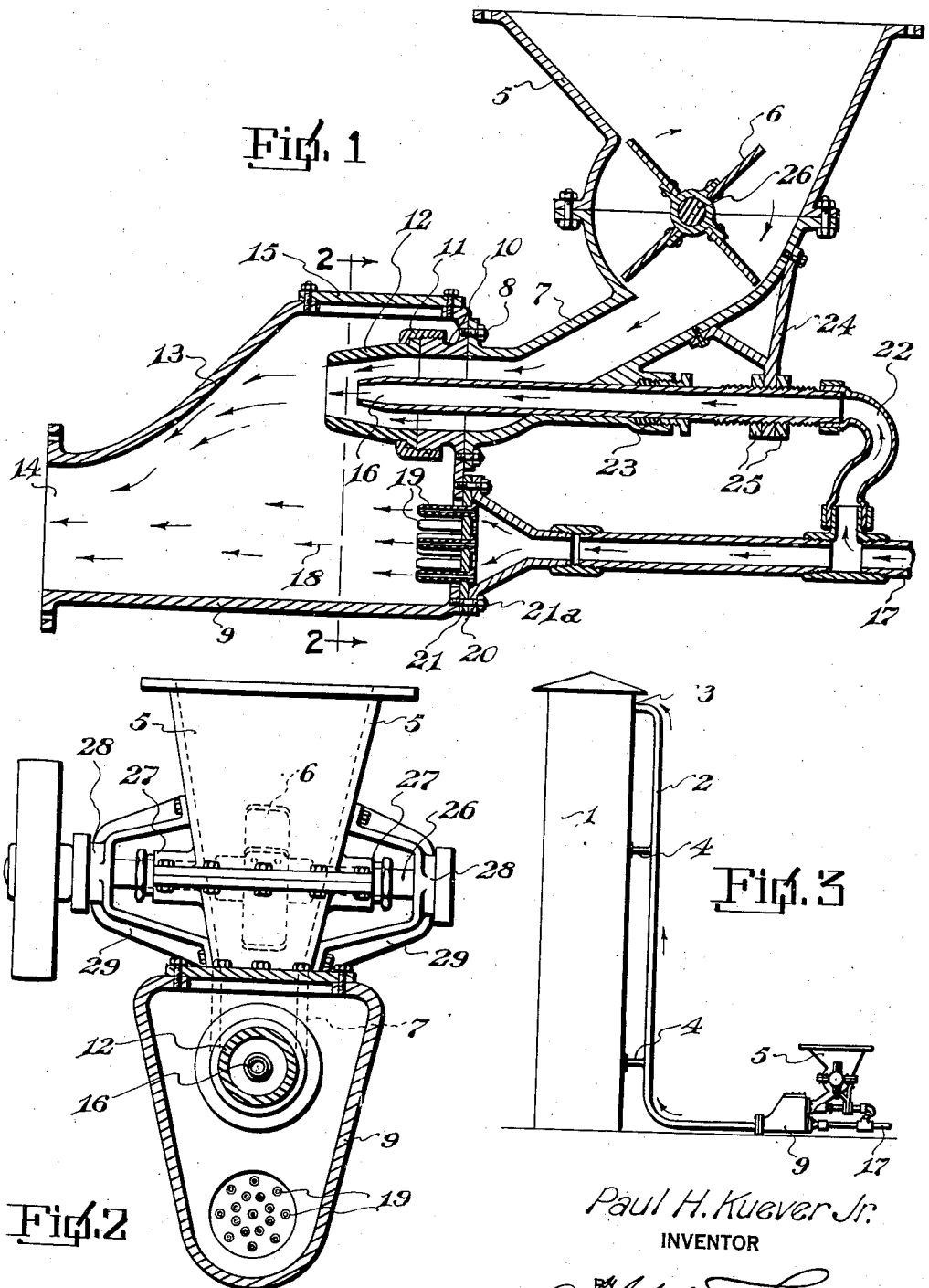

2,272,564

UNITED STATES PATENT OFFICE 2,272,564

DRY CEMENT CONVEYER

Paul H. Kuever, Jr., Ada, Okla., assignor of twenty-five per cent to Mrs. E. M. Kuever, St. Louis, Mo., and twenty-five per cent to F. Blaine Rhoades, Fort Smith, Ark.

Application January 28, 1941, Serial No. 376,387

6 Claims. (Cl. 302—47)

The invention relates to cement conveyers and has for its object to provide a device of this kind wherein cement particles from a hopper are projected against a disintegrating plate by an air nozzle in the discharge end of the hopper for breaking large particles of cement and clouding the small particles and broken particles, in air suspension into a blast of air for maintaining the particles in suspension and forcing the same through a conduit, preferably leading to a storage silo.

A further object is to provide a conveyer device particularly adapted for conveying, by means of a blast of air, cement particles and during this operation breaking up larger particles of cement and directing the same into the blast of air.

A further object is to provide means whereby the hopper nozzle can be adjusted in the discharge end of the hopper for varying the amount of vacuum in said discharge end, which vacuum sucks material from the hopper in which the material is agitated.

A further object is to provide a detachable nozzle on the hopper discharge end, and to provide means whereby access may be readily had to the nozzle for removal and replacement purposes.

A further object is to provide the breaking up and suspension casing with a plurality of nozzles extending therein below the hopper nozzle and to mount said nozzles on a removable plate so they can be easily placed in position or removed therefrom.

A further object is to provide a flexible connection between the adjustable hopper nozzle and the high pressure line leading to the multiple nozzles so that the hopper nozzle can be adjusted without disturbing the multiple nozzles.

A further object is to converge downwardly opposite sides of the suspension casing so the downwardly deflected particles from the hopper nozzle will come within the zone of high pressure air from the multiple nozzles for the suspension and lifting operation.

A further object is to provide an agitator within the hopper for agitating the material and forcing the same through the hopper spout towards the hopper nozzle where it is rapidly entrained and projected by vacuum in the hopper nozzle, thereby preventing packing of the hopper spout.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the conveyer.

Figure 2 is a vertical transverse sectional view taken on line 2—2 of Figure 1.

Figure 3 is a side elevation of the conveyer and a storage silo.

Referring to the drawing, the numeral 1 designates a conventional form of storage silo into which the crushed and pulverized cement is discharged through an upwardly extending conduit 2, connected at 3 to the upper end of the silo. The conduit 2 is preferably secured to the silo by means of braces 4. Although a conventional form of silo is shown, it is obvious the powdered cement is discharged at any suitable point for settling purposes.

Crushed and pulverized cement is discharged into a hopper 5 where it is continuously agitated by a slow moving agitator 6. The agitator 6 also forces the crushed and pulverized cement downwardly through the discharge throat 7, which inclines and has connected thereto, by means of bolts 8, a suspension casing 9. Casing 9 is provided with an annular flange 10, to which is connected by means of a threaded coupling 11 a horizontally disposed nozzle 12, which nozzle is in alinement with a downwardly and inwardly inclined deflecting wall 13 which deflects the particles towards the discharge opening 14 of the casing, to which discharge opening is connected the lower end of the conduit 2. The upper side of the casing 9 is provided with a removable inspection plate 15 which allows ready access to the chamber of the casing 9, and particularly for replacing nozzles 12 which become worn. Extending horizontally and axially into the nozzle 12 is an air supply nozzle 16, through which high air pressure passes from a supply pipe 17. As the air leaves the air nozzle 16 a vacuum is created within the nozzle 12, which quickly and rapidly sucks particles from the throat 7, thereby preventing material being packed in the throat and this discharged material is projected against the inclined wall 13 where it is further broken up.

It will be noted that the air stream from the nozzle 12 is directed downwardly by the deflecting wall 13 towards the discharge opening 14 and into the zone of the air blast 18 from the multiple nozzles 19 below the nozzle 12 and in alinement with the discharge opening 14, therefore it will be seen that the cement particles which are in suspension are forced upwardly through the conduit 2 with the assistance of the air blast from the nozzles 19, and maintained in suspension until they are discharged into the upper end of the silo 1.

The nozzles 19 are carried by a nozzle head 20, and the nozzles extend through a plate 21 interposed between the nozzle head 20 of the high pressure air supply line 17 and the rear wall of the casing 9, and is secured in place by means of bolts 21ª. By removing the bolts it will be seen that the nozzle plate can be easily removed for repair or replacement purposes, and this action is facilitated by the flexible hose connection 22 between the pipe 17 and the rear end of the nozzle 16.

The nozzle 16 extends rearwardly through a packing gland 23 and through a supporting bracket 24, and threaded on the nozzle 16 at opposite sides of the bracket 24 are lock nuts 25 for holding the nozzle 16 in adjusted position. By adjusting the nozzle 16 within the nozzle 12, it will be seen that the amount of vacuum created for suction purposes in the nozzle 12 may be varied according to the fineness of material being lifted.

The agitator 6 is mounted on a transverse shaft 26 which extends through packing glands 27 on the outside of the hopper and into bearings 28 of supporting brackets 29. By locating the bearings to the outside of the hopper it will be seen that fine powdered cement will not accumulate therein and wear the bearing which is one of the difficulties now experienced with agitator shafts in hoppers of this kind.

From the above it will be seen that a conveying and lifting device is provided for fine particles of material in air suspension, and the device is simple in construction and operation and particularly adapted for conveying cement particles from a hopper to a storage member; it being understood that the crushed material enters the hopper from any suitable type of crusher.

The invention having been set forth what is claimed as new and useful is:

1. A device for conveying material particles in air suspension, said device comprising a hopper, a chambered casing, a discharge spout carried by the hopper and extending into the casing chamber, a nozzle carried by the spout and disposed within the casing chamber, a primary air nozzle extending into the end of the hopper spout and into the nozzle carried thereby, a downwardly and outwardly extending deflecting wall carried by the casing opposite the hopper spout nozzle, the outer end of said casing having a discharge opening, and a secondary air supply pipe terminating in multiple jet nozzles within the casing.

2. A device as set forth in claim 1 wherein the air supply nozzle is axially adjustable within the hopper spout nozzle.

3. A device as set forth in claim 1 wherein the air supply nozzle is axially adjustable within the hopper spout nozzle and a flexible connection between the air supply nozzle and the air supply pipe leading to the nozzle below the hopper spout nozzle.

4. A device as set forth in claim 1 including a removable inspection plate carried by the upper side of the casing adjacent the hopper spout nozzle.

5. A device as set forth in claim 1 including a removable inspection plate carried by the casing adjacent the hopper spout nozzle, said hopper spout nozzle being detachably mounted.

6. A device as set forth in claim 1 wherein the nozzle carried by the casing below the hopper spout nozzle comprises a plurality of tubular members, a plate located outside the casing and on which the tubular members are mounted said plate being detachably mounted between the air supply pipe and the casing and a flexible connection between the air supply pipe and the air nozzle and forming means whereby the air tube plate may be easily removed.

PAUL H. KUEVER, Jr.